(12) United States Patent
Bateman et al.

(10) Patent No.: US 7,476,055 B2
(45) Date of Patent: Jan. 13, 2009

(54) UNDERGROUND AND PARTLY SUBMERGED PIPE WINDING APPARATUS AND METHOD

(75) Inventors: Ian Roger Bateman, 3 Short St., Marino, 5049, South Australia (AU); Craig Anthony Mayman, Bellevue Heights (AU)

(73) Assignee: Ian Roger Bateman

( * ) Notice: Subject to any disclaimer, the term of this patent is extended or adjusted under 35 U.S.C. 154(b) by 222 days.

(21) Appl. No.: 10/588,204

(22) PCT Filed: Apr. 10, 2006

(86) PCT No.: PCT/AU2006/000474

§ 371 (c)(1),
(2), (4) Date: Aug. 2, 2006

(87) PCT Pub. No.: WO2006/108216

PCT Pub. Date: Oct. 19, 2006

(65) Prior Publication Data

US 2008/0205991 A1 Aug. 28, 2008

(30) Foreign Application Priority Data

Apr. 14, 2005 (AU) .............................. 2005901859

(51) Int. Cl.
*B29C 63/32* (2006.01)
(52) U.S. Cl. ...................... 405/184.2; 405/156; 138/97
(58) Field of Classification Search .............. 405/184.1, 405/184.2, 156; 138/97, 98
See application file for complete search history.

(56) References Cited

U.S. PATENT DOCUMENTS

| 4,678,370 A * | 7/1987 | Allen .................... 405/184.2 |
| 5,145,281 A * | 9/1992 | Molyneux ............... 405/184.2 |
| 5,388,929 A * | 2/1995 | Molyneux ............... 405/184.2 |
| 5,725,328 A * | 3/1998 | Schmager ................ 405/151 |
| 5,799,701 A * | 9/1998 | Kitahashi et al. .......... 138/97 |
| 7,186,060 B2 * | 3/2007 | Akimoto et al. .......... 405/184.2 |
| 2004/0013472 A1 * | 1/2004 | Akimoto et al. .......... 405/184.2 |

FOREIGN PATENT DOCUMENTS

WO    WO 98/34742    *    8/1998

* cited by examiner

*Primary Examiner*—Frederick L Lagman
(74) *Attorney, Agent, or Firm*—Klauber & Jackson, LLC

(57) ABSTRACT

An apparatus and method for lining an underground conduit is disclosed. The apparatus 10 comprises: an annular frame 40 having a crown portion 42 and a base portion 49; a strip guide disposed around and supported by the annular frame 40, the guide arranged to guide a strip 12 around a helical path; a pair of strip pinch rollers mounted to the frame 40 at a position circumferentially about halfway between the crown portion 42 and the base portion 49; a drive assembly mounted to the frame for driving the strip 12 downwards into the helical path in a winding direction so as to present an incoming first edge to an adjacent second edge of a wound convolution of the strip; a liquid remover mounted to the frame, the liquid remover arranged to prevent liquid that has adhered to and ascended with the second edge from descending down towards the incoming first edge; and an extruder 80 mounted to the frame 40 for extruding a molten bead of plastic onto the strip 12 at a position just before said overlap.

22 Claims, 10 Drawing Sheets

UNDERGROUND AND PARTLY SUBMERGED PIPE WINDING APPARATUS AND METHOD

FIELD OF THE INVENTION

The present invention relates to relining of underground conduits such as storm water and sewerage pipes. In particular, the present invention relates to relining where the pipe is in service and is carrying a liquid.

BACKGROUND

Many techniques are currently used for relining underground conduits. One method of relining conduits involves the digging of a "launch trench" into which lengths of new pipe are lowered. The pipe lengths are then slid into the host pipe and are joined together to form a continuous new pipe. Generally with this method, the conduit being relined must be dry. This is often achieved by "over pumping" (pumping the water, sewerage or other fluid above the surface so that it bypasses sections of the conduit being relined).

Methods that require "over pumping" are undesirable due to the cost and complexities involved with the over pumping process.

Another method of relining underground conduits involves placing a pipe winding machine into an access pit and then feeding an elongate plastic strip into the pit. The machine then winds the strip into an elongate helical pipe. The applicant has developed various machines and methods for winding such a helical pipe. Some of these methods do not require "over pumping" and can be carried out while a conduit being relined is in service. However, these methods are not suitable for producing a welded pipe.

In some applications, it is desirable to provide a fully welded pipe. Fully welded, or continuously welded pipes, are watertight.

It is an object of the present invention to provide a method suitable for relining an operational underground pipe that eliminates or at least minimises the need for trenching and provides a continuously welded pipe.

SUMMARY OF THE INVENTION

According to a first aspect of the invention there is provided a method of lining an underground conduit while the conduit is in service carrying a liquid, the method comprising the steps of:
  positioning a pipe winding apparatus within an access pit adjoining the conduit to be relined, the pipe winding apparatus having an annular cage through which the liquid flows;
  feeding the pipe winding apparatus an elongate plastic or plastic composite strip down into the pit, the strip having parallel spaced apart first and second edges;
  driving the strip downwards into the annular cage so as to present an incoming first edge to an adjacent second edge of a wound convolution of the strip;
  preventing liquid that has adhered to and ascended with the second edge from descending down towards the incoming first edge;
  applying a molten bead of plastic to at least one of the incoming first edge and the adjacent second edge of the newly wound pipe; and
  compressing the bead between the incoming first edge and the adjacent second edge,
  thereby forming an elongate continuously welded pipe in situ.

Preferably the method further comprises a step of:
  heating at least one of the incoming first edge and the adjacent second edge of the newly wound pipe,
  whereby the heating step improves adhesion of the bead to at least one of the incoming first and adjacent second edges.

Preferably the heating step comprises:
  directing hot gas towards the incoming first edge, the gas heating the first edge; and
  directing hot gas towards the adjacent second edge, the gas heating the second edge.

Preferably the preventing step comprises directing gas towards the second edge at a circumferential position on the second edge, the circumferential position being on an arc between the liquid being carried by the conduit and a point at or near the zenith of the second edge.

Preferably the gas directed towards the second edge is directed in a direction substantially opposite of the direction of travel of the second edge.

Alternatively the preventing step comprises wiping the second edge at a circumferential position on the second edge, the circumferential position being on an arc between the liquid being carried by the conduit and a point at or near the zenith of the second edge.

Preferably the wiping comprises brushing with a counter rotating brush.

In a further alternative the preventing step comprises inducing a partial vacuum at a circumferential position on the second edge, the circumferential position being on an arc between the liquid being carried by the conduit and a point at or near the zenith of the second edge.

According to a second aspect of the invention there is provided a method of lining an underground conduit while the conduit is in service carrying a liquid, the method comprising the steps of:
  positioning a pipe winding apparatus within an access pit adjoining the conduit to be relined, the pipe winding apparatus having an annular cage through which the liquid flows;
  feeding the pipe winding apparatus an elongate plastic or plastic composite strip down into the pit, the strip having parallel spaced apart first and second edges;
  winding the strip into the annular cage so as to form adjacent convolutions;
  directing a jet of hot gas towards an area spanning adjacent convolutions of the strip thereby creating a void within the liquid; and
  welding adjacent convolutions of the strip together within the gas void,
  thereby forming an elongate continuously welded pipe in situ.

According to a third aspect of the invention there is provided an apparatus for lining an underground conduit, the apparatus comprising:
  an annular frame in use having a crown portion and a base portion;
  a strip guide disposed around and supported by the annular frame, the guide arranged to guide a strip around a helical path when the machine is in use, the path having a zenith;
  a drive assembly mounted to the frame for driving the strip downwards into the helical path in a winding direction so as to present an incoming first edge to an adjacent second edge of a wound convolution of the strip;
  a liquid remover mounted to the frame, the liquid remover arranged to prevent liquid that has adhered to and ascended with the second edge from descending down towards the incoming first edge; and an extruder mounted to the frame, the extruder having a nozzle in use extruding a molten bead of plastic onto the strip at a position just before said overlap.

Preferably the apparatus further comprises:

a pair of strip pinch rollers mounted to the frame at a position circumferentially about halfway between the crown portion and the base portion, the pinch rollers driven by the drive assembly.

Preferably the apparatus further comprises:

a heater mounted to the frame and positioned to heat at least one of the incoming first edge and the second edge.

Preferably the heater comprises:

a first gas nozzle mounted to the frame, the first nozzle arranged to direct hot gas towards the incoming first edge; and a second gas nozzle mounted to the frame, the second nozzle arranged to direct hot gas towards the second edge.

Alternatively the heater comprises:

a first radiator mounted to the frame, the first radiator arranged to radiate heat towards the incoming first edge; and a second radiator mounted to the frame, the second radiator arranged to direct radiant heat towards the second edge.

Preferably the liquid remover comprises a third gas nozzle mounted to the frame, the third nozzle arranged to direct gas towards the second edge at a circumferential position on the second edge, the circumferential position being on an arc between the liquid being carried by the conduit and a point at or near the zenith of the second edge, wherein in use the third nozzle prevents liquid that has adhered to and ascended with the second edge from descending down towards the incoming first edge.

Alternatively the liquid remover comprises a wiper mounted to the frame, the wiper engaging the second edge at a circumferential position on the second edge, the circumferential position being on an arc between the liquid being carried by the conduit and a point at or near the zenith of the second edge, wherein in use the wiper prevents liquid that has adhered to and ascended with the second edge from descending down towards the incoming first edge.

Preferably the wiper comprises a rotating brush.

In a further alternative the liquid remover comprises a partial vacuum inducing assembly mounted at a circumferential position on the second edge, the circumferential position being on an arc between the liquid being carried by the conduit and a point at or near the zenith of the second edge.

Preferably the annular cage is substantially cylindrical in shape.

Preferably the crown portion comprises a lifting member liftable by a crane. According to a fourth aspect of the invention there is provided an apparatus for lining an underground conduit while the conduit is in service carrying a liquid, the apparatus comprising:

a cylindrical frame in use having a crown portion and a base portion;

a plurality of substantially parallel spaced apart rollers disposed around and supported by the cylindrical frame, the rollers forming a guide to guide a strip around a helical path when the machine is in use, the path having a zenith;

a pair of strip pinch rollers mounted to the frame at a position circumferentially about halfway between the crown portion and the base portion;

a primary drive assembly mounted to the frame and operably connected to the pinch rollers for driving the strip downwards into the helical path in a winding direction so as to present an incoming first edge to an adjacent second edge of a wound convolution of the strip;

a liquid remover mounted to the frame, the liquid remover arranged to prevent liquid that has adhered to and ascended with the second edge from descending down towards the incoming first edge; and an extruder mounted to the frame, the extruder having a nozzle in use extruding a molten bead of plastic onto the strip at a position just before said overlap.

Preferably the apparatus further comprises a secondary drive assembly mounted to the frame, the secondary drive assembly providing additional driving torque to the primary drive assembly, wherein the additional driving torque allows the pipe to be produced in longer lengths in situ.

Specific embodiments of the invention will now be described in some further detail with reference to and as illustrated in the accompanying Figures. These embodiments are illustrative, and are not meant to be restrictive of the scope of the invention.

DETAILED DESCRIPTION OF A PREFERRED EMBODIMENT OF THE INVENTION

A preferred embodiment of the invention is illustrated in the accompanying representations in which:

FIG. 2b is a detailed perspective view of the top of the apparatus show in FIG. 2a.

FIG. 5 shows a cross sectional view of a plastic composite strip (profile) used in the method illustrated in FIGS. 1 and 3a.

Figure 1:
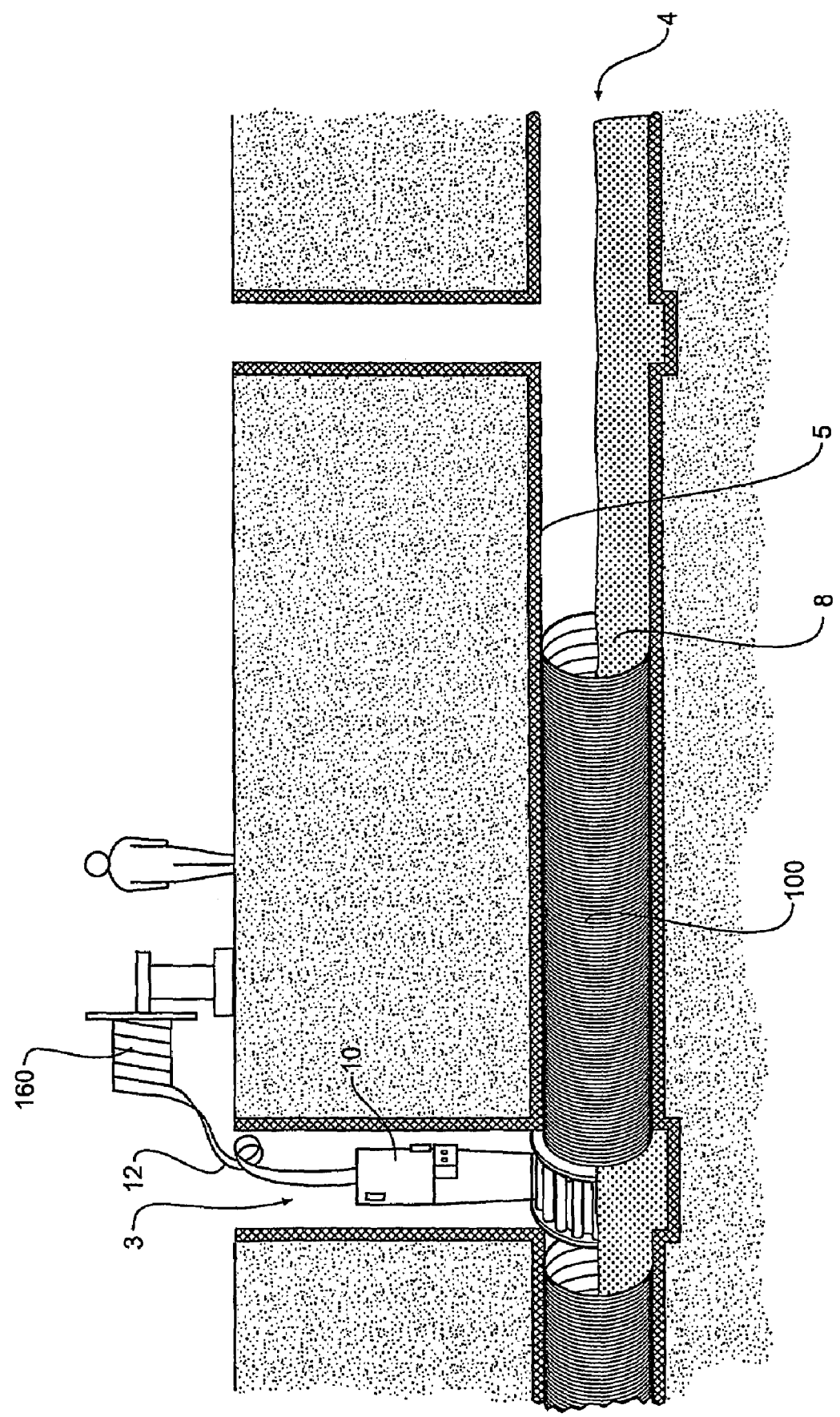
FIG. 1 shows a schematic cross sectional view of an underground conduit being relined using a method according to the invention.

Referring to FIG. 1, a pipe winding apparatus 10 is shown in position within an access pit 3 adjoining a conduit 5 to be relined. The pipe winding apparatus 10 has an annular frame 40 (best shown in FIG. 2a) through which liquid can flow. Thus, the conduit or pipe 5 can be rehabilitated while in service (carrying storm water or sewage for instance).

Figure 5:
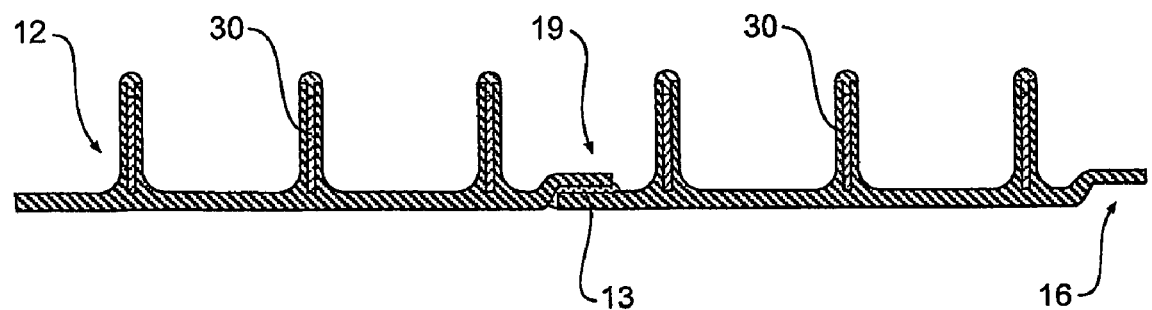

A spool 160 positioned above ground feeds the pipe winding apparatus 10 with an elongate plastic or plastic composite strip 12 down into the pit 3. Various strips or profiles can be used. FIG. 5 shows a cross sectional view of two adjacent convolutions of a composite strip that is suitable for use with the method of the invention.

Figure 2A:
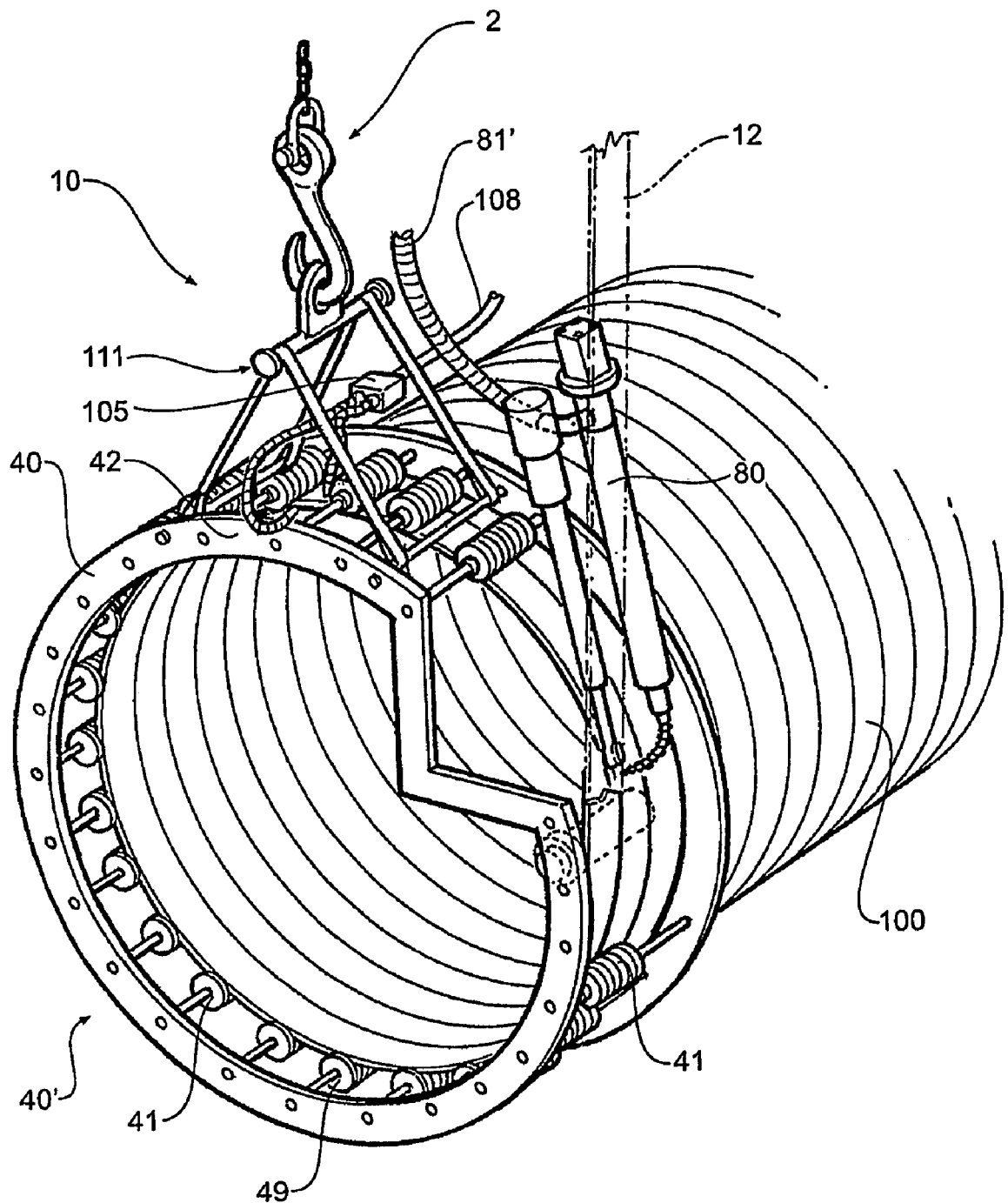
FIG. 2a is a perspective view of a pipe winding apparatus used with the method of FIG. 1.
Figure 3A:
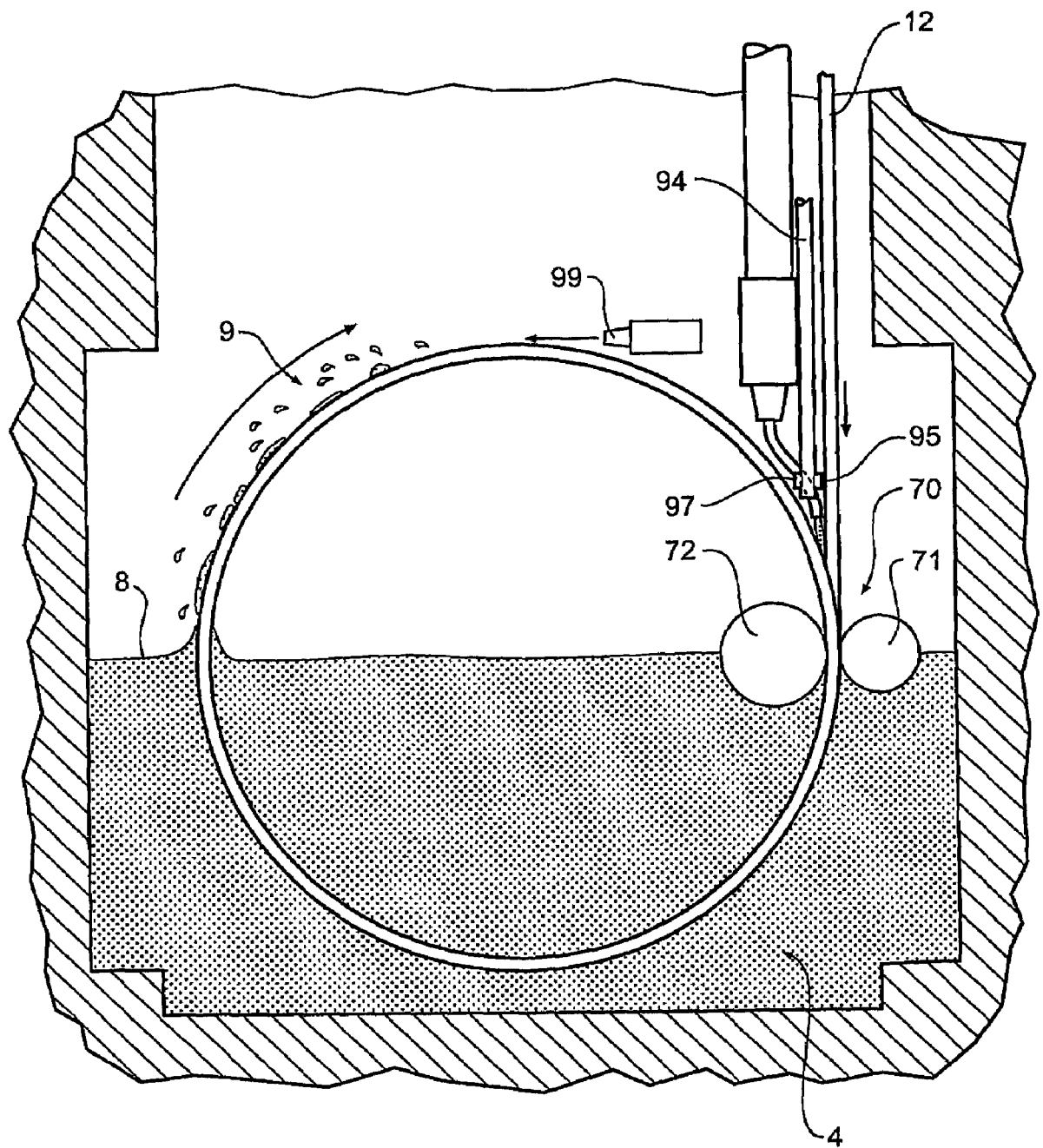
FIG. 3a is a schematic cross sectional view showing the method and apparatus illustrated in FIGS. 1, 2a and 2b in more detail.
Figure 4A:
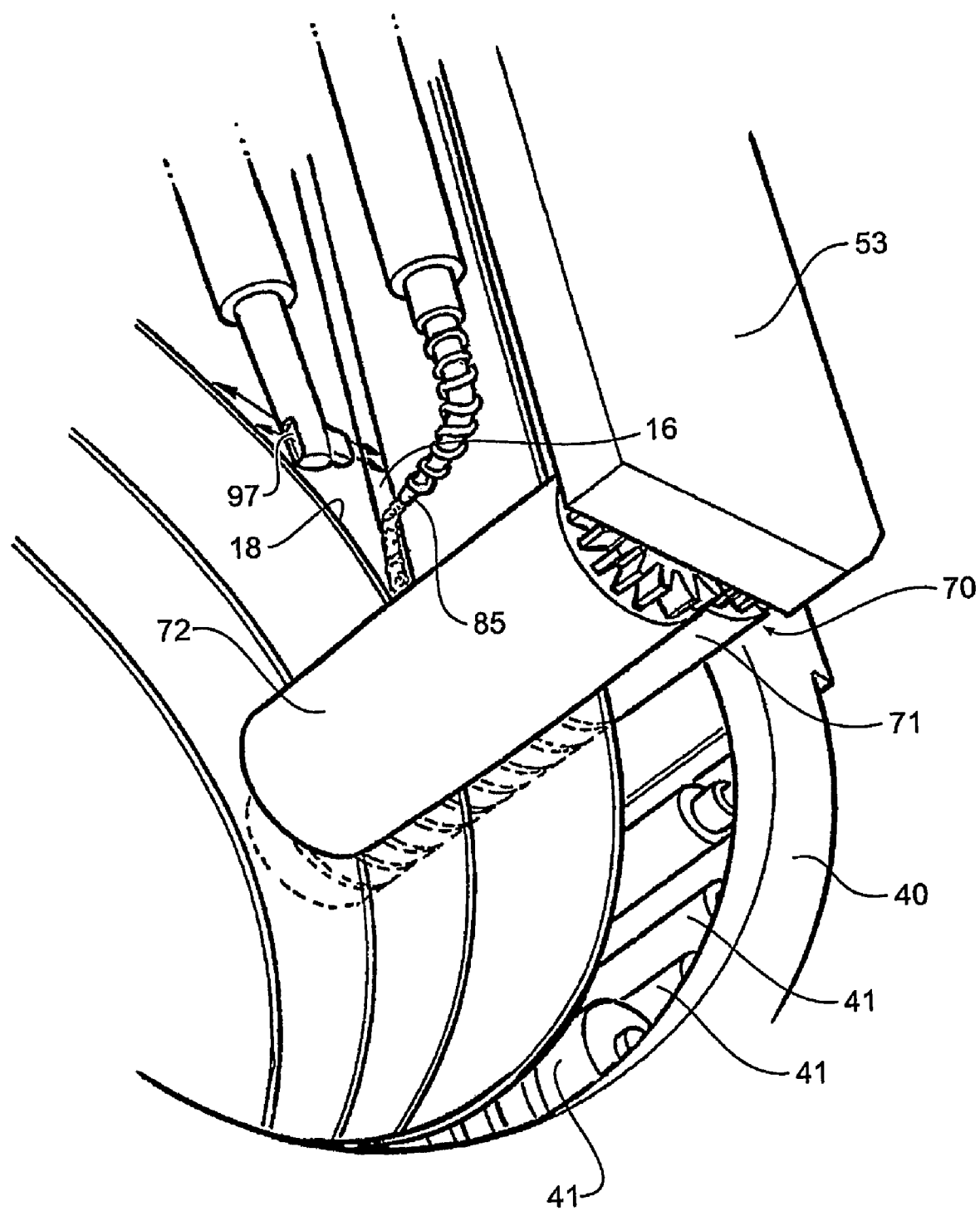
FIG. 4a is a perspective detailed view of the apparatus shown in FIGS. 2a and 2b.
Figure 4B:
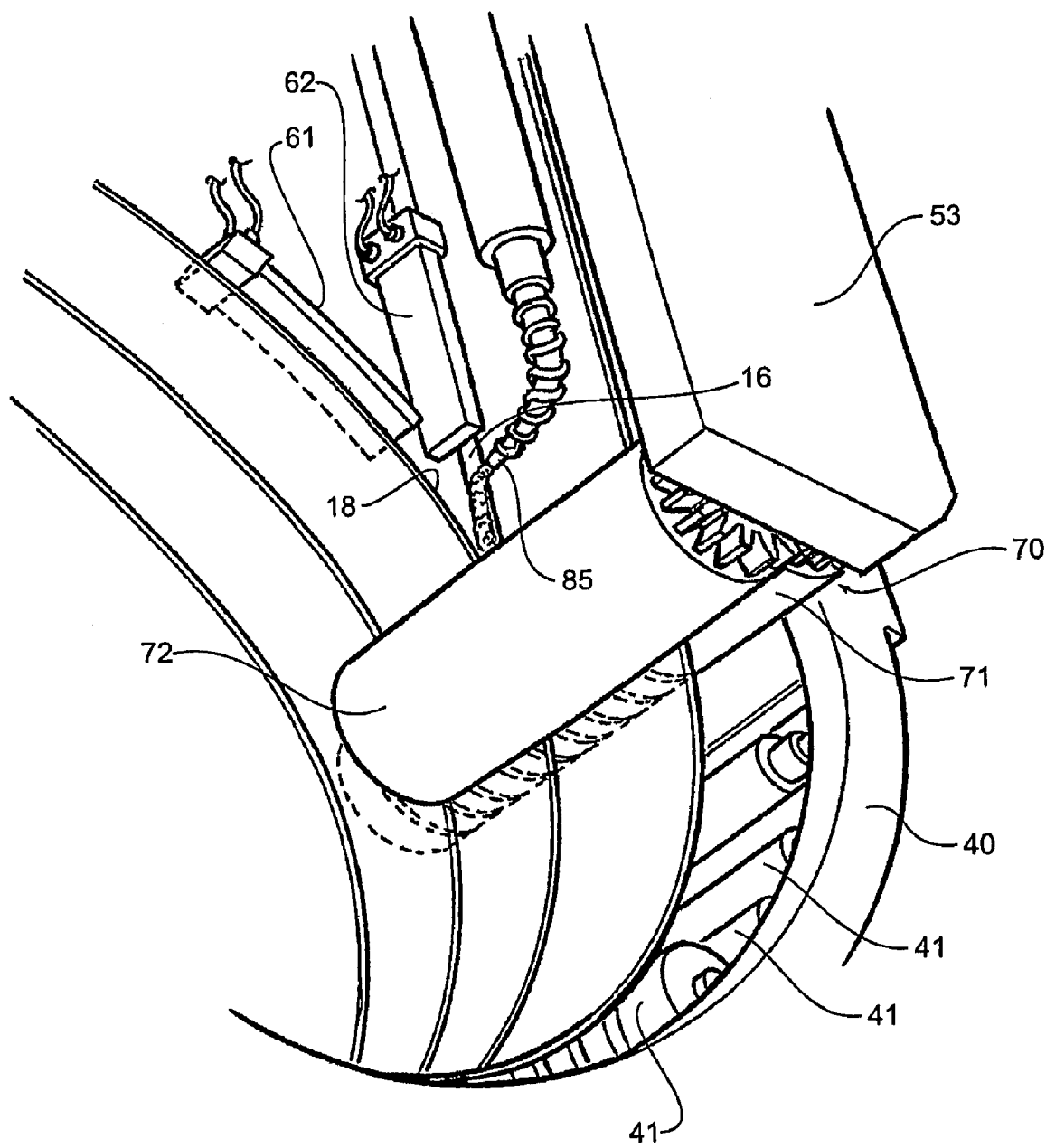
FIG. 4b is a perspective detailed view of the apparatus shown in FIGS. 2a and 2b but with an alternative heater means.

Referring to FIGS. 2a, 3a and 4, the apparatus 10 includes an annular cylindrical frame 40 that in use has a crown portion 42 that is liftable by a crane having a hook 2. The annular frame also has a base portion 49 that in use may rest on the conduit 4. The apparatus 10 also includes a plurality of substantially parallel spaced apart rollers 41 disposed around and supported by the annular frame 40. The rollers 41 form a guide to guide the strip 12 around a helical path when the machine is in use. The path has a zenith adjacent the crown of the annular frame 40.

The apparatus 10 further includes a pair of primary strip pinch rollers 71 and 72 mounted to the frame 40 at a position circumferentially about half way between the crown portion 42 and the base portion 49. A drive assembly 53 is also mounted to the frame 40 for driving the strip 12 into the helical path in a winding direction such that the adjacent edge portions 16 and 18 of adjacent convolutions of the strip 12 overlap.

A gas nozzle 99 is mounted to the frame 40 and is arranged to direct gas (in this embodiment, air) in a direction across and having components towards the zenith of the strip path and against the winding direction of the strip 12.

The gas nozzle 99 prevents the water and debris (accretions) 9 illustrated in FIG. 3a from travelling down towards the welding area as is clearly illustrated in the schematic of FIG. 3a.

Figure 2B:
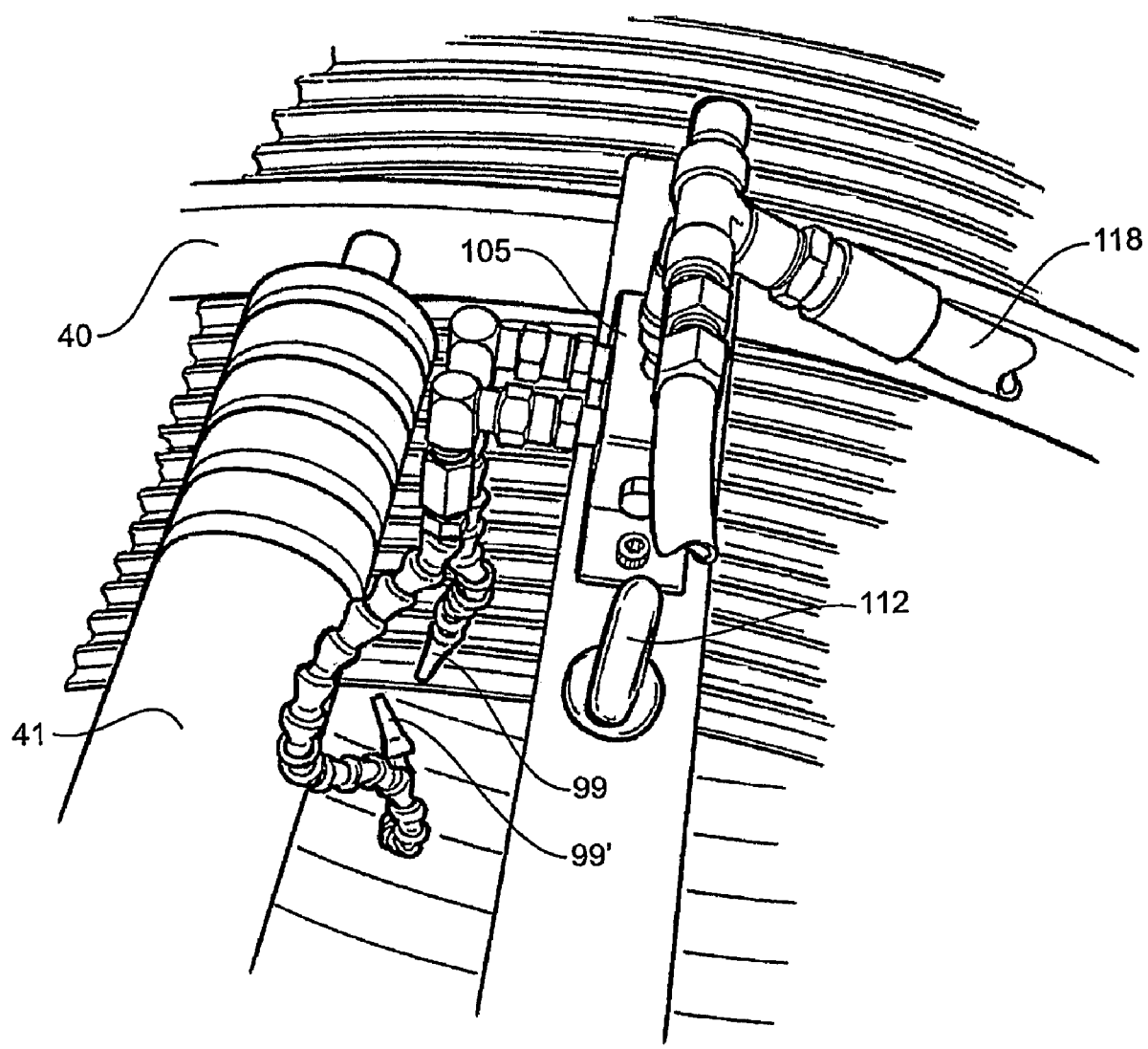

FIG. 2b shows an additional nozzle 99'. This nozzle helps ensure that the edge of the strip is cleared of water and debris. In other embodiments of the invention, the additional nozzle will not be needed. Both nozzles are fed by compressed air through a supply line 108 and a manifold 105.

Various other means can be employed to prevent accretions travelling down towards the welding area. Some of these alternative means are shown in FIGS. 3b, 3c and 3d.

Figure 3B:
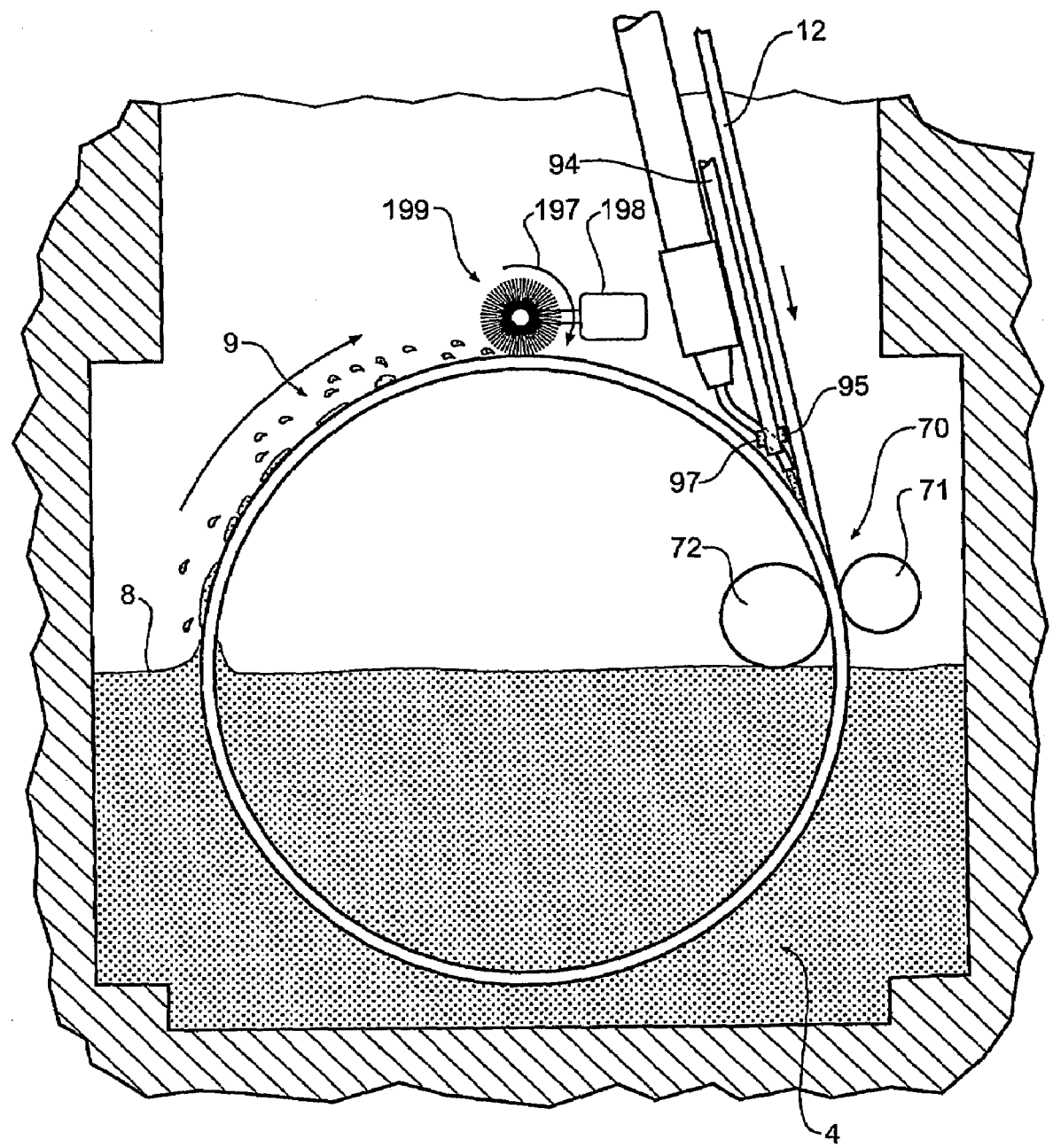
FIGS. 3b, 3c and 3d are similar views to that of FIG. 3a, but show alternative embodiments.
Figure 3C:
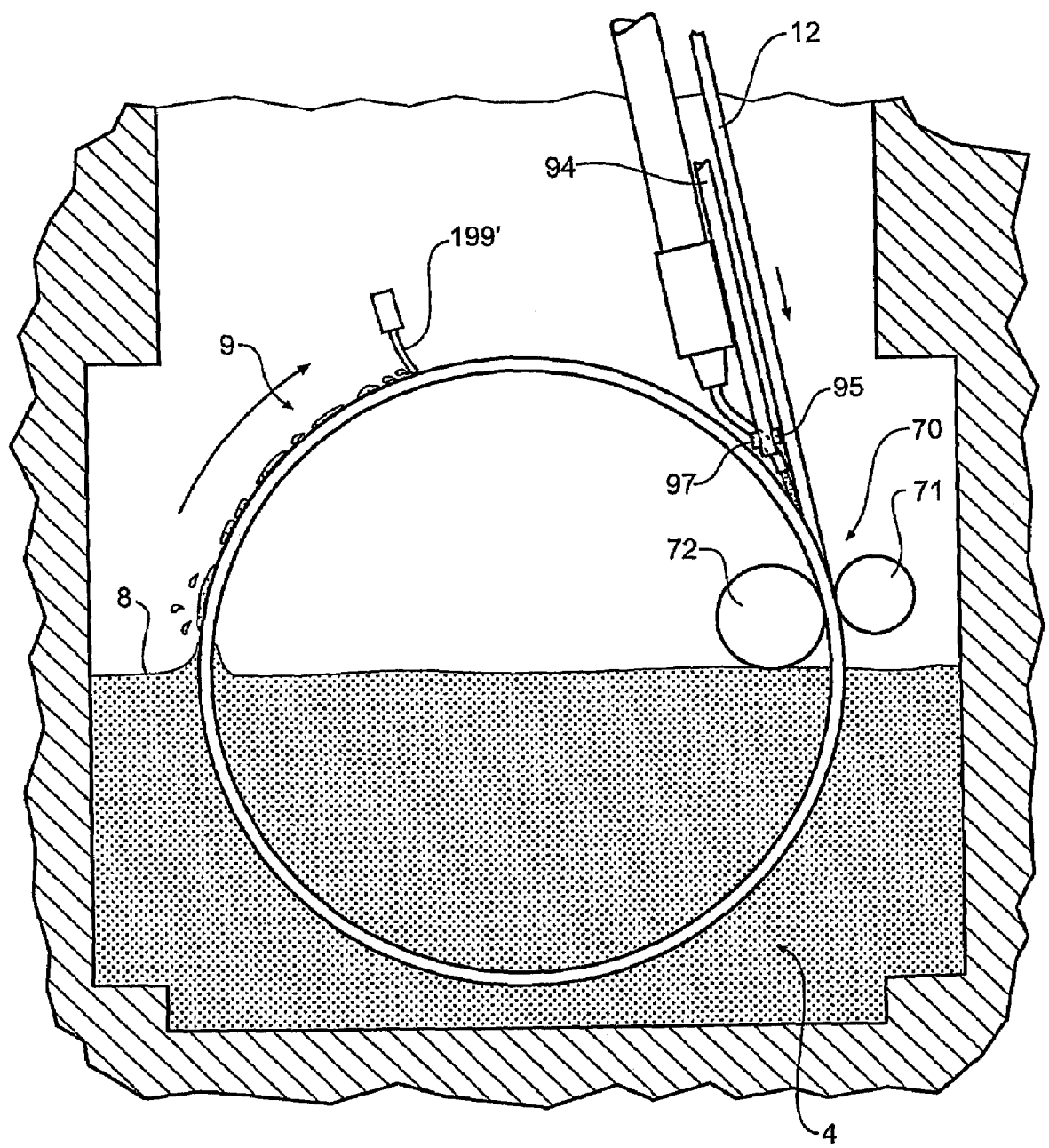

Referring to FIGS. 3b and 3c, liquid removers in the form of wipers are shown. The wiper of FIG. 3b is a counter-rotating brush 199 driven in a direction 197 by a motor 198. While various motors can be employed, preferably the motor 198 is either pneumatically or hydraulically driven. An alternative simplified wiper is shown if FIG. 3c. This wiper 199' is in the form of a flexible rubber or plastic member.

Figure 3D:
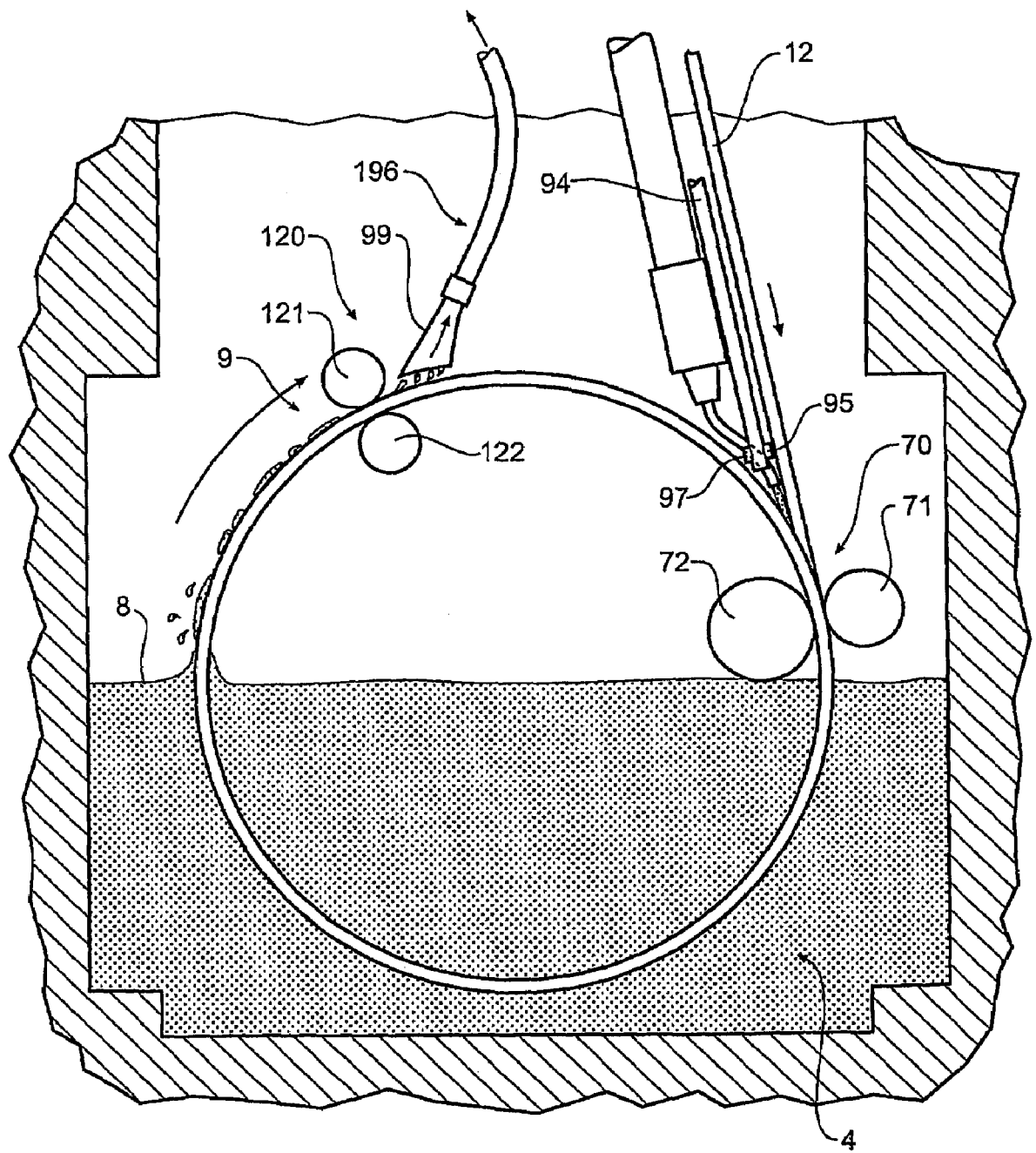

A further alternative liquid remover is shown in FIG. 3d. The liquid remover of FIG. 3d comprises a partial vacuum inducing assembly 196. This assembly includes a suction nozzle 99.

In FIG. 2b, an alternative lifting eye 112 is shown to the lifting frame 111 shown in FIG. 2a.

The winding apparatus shown in FIGS. 2a, 2b and 5 is driven by a hydraulic motor 60 (not shown). The hydraulic motor 60 is able to operate in harsh conditions and provides a high torque output to drive the strip 12 around the inside of the rollers 41. An optional secondary drive assembly having pinch rollers 121 and 122 as shown in FIG. 3d may be provided. The secondary drive assembly provides additional driving torque which can allow parts to be produced in longer lengths in situ. FIG. 3d shows the primary drive assembly 70 and the secondary drive assembly 120. The secondary drive unit can of course be employed in other embodiments of the invention schematically illustrated in FIGS. 3a, 3b and 3c.

Referring to FIG. 2a, an extruder 80 forms part of the apparatus 10. The extruder 80 is fed with plastic pellets through a supply tube 81. The extruder 80 has a nozzle 85 that applies a molten bead of plastic to the incoming first edge 16 as is most clearly shown in FIG. 4a.

Polyethylene plastic can be used for both the strip 12 and as the feed stock for the extruder 80. Polyethylene is a low cost plastic that has excellent chemical properties making it highly suitable for rehabilitating pipes. While it lacks the stiffness of PVC, when combined with a reinforcing strip such as the strip 30 illustrated in FIG. 5, a stiff pipe can be wound. While the method of the invention is particularly suitable for polyethylene pipes, other plastics may be used.

After the molten bead of plastic has been applied to the incoming first edge 16, the bead is compressed between the incoming first edge 16 and the adjacent second edge 18 between a pinch roll assembly of primary drive assembly 70 having opposed rollers 71 and 72. FIG. 5 shows the resultant welded seam 19. As this is a continuous process, a continuous weld is created.

While in the drawings the bead is shown being applied to the incoming first edge 16, in other embodiments of the invention, the bead may be applied to the adjacent second edge.

Referring to FIGS. 2b and 3a, it can be seen that conduit 94 carries hot air towards nozzles 95 and 97. Nozzle 97 directs hot air towards the adjacent second edge in a direction substantially opposite the direction of travel of the adjacent second edge. The hot air exiting nozzles 95 and 97 preheats and dries the edges of the strip 12 to facilitate the welding process. Alternative means of pre-heating the edges of the strip to facilitate the welding process can be used. For instance, radiant heaters such as the electric resistance radiant heaters 61 and 62 shown in FIG. 4b may be used. Other heating means such as friction means may also be used to facilitate the welding process.

The apparatus described and illustrated in FIG. 4 can be used to line an underground conduit while the conduit is in service carrying a liquid. Once the pipe winding apparatus has been positioned within an access pit adjoining the conduit to be relined, it is fed with an elongate plastic or plastic composite strip 12 down through an access pit 3 as is illustrated most clearly in FIG. 1. The strip 12 is driven downwards into the cylindrical cage 40' so as to present an incoming first edge 16 to an adjacent second edge 18 of a wound convolution of the strip 12. The high velocity air directed from nozzles 99 and 99' prevents liquid and/or other accretions that have adhered to it ascending with the second edge 18 and from descending down towards the incoming first edge 16. Hot air is directed to both the incoming first edge 16 and the adjacent second edge 18 in order to heat the edges before a molten beaded plastic is applied to either one of the incoming first edge 16 or adjacent second edge 18 and before compressing the bead between the incoming first edge 16 and the adjacent second edge 18.

With the method described thus far, a pipe can be wound in situ while the conduit 4 is still in service. If however, the conduit 4 is running at or near capacity then the water level illustrated in FIG. 3a will be somewhat higher. According to a further aspect of the invention a method is provided that will operate in such conditions. A method embodying the second aspect of the invention includes a step of directing a jet of hot gas towards an area spanning adjacent convolutions of the strip thereby creating a void within the liquid. Welding of adjacent convolutions of the strip together then occurs within the gas void. In other respects, such a method embodying this aspect of the invention is similar to the first embodiment described above.

Figure 6:
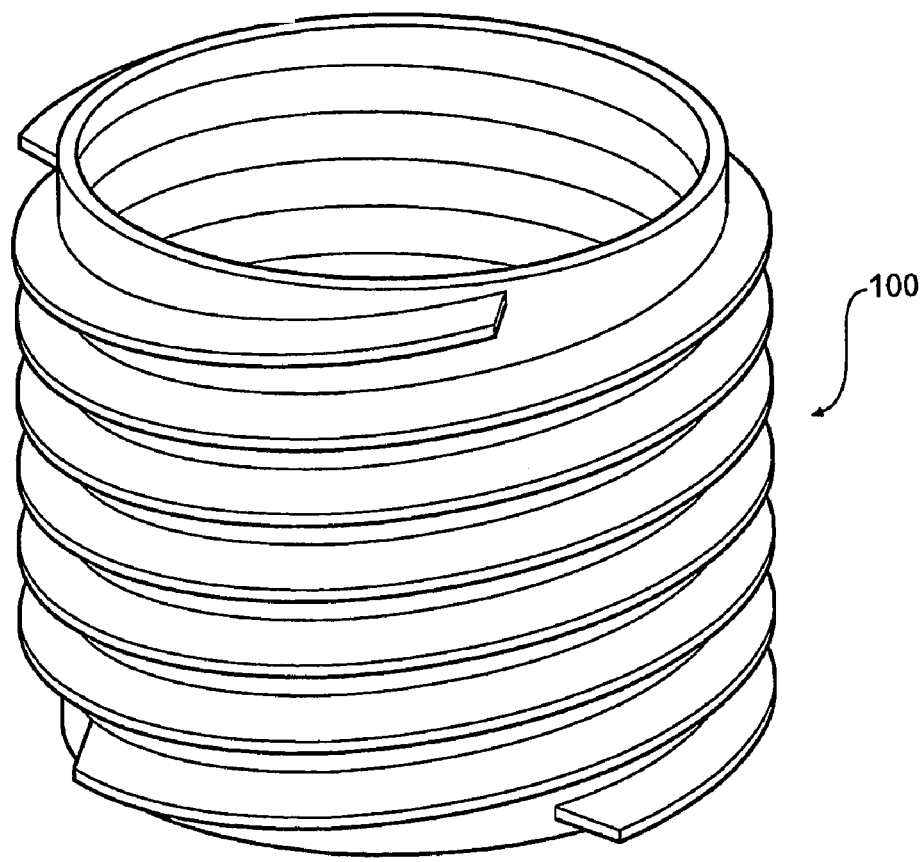
FIG. 6 is a perspective view of a pipe produced by the method illustrated in the preceding Figures.

The actual pipe 100 wound by either of the above-described methods is illustrated in the perspective view of FIG. 6. This pipe is a continuously welded pipe that provides a watertight conduit of high integrity.

While the present invention has been described in terms of preferred embodiments, in order to facilitate a better understanding of the invention, it should be appreciated that various modifications can be made without departing from the principles of the invention. Therefore, the invention should be understood to include all such modifications within its scope.

The claims defining the invention are as follows:

1. A method of lining an underground conduit while the conduit is in service carrying a liquid, the method comprising the steps of:
   positioning a pipe winding apparatus within an access pit adjoining the conduit to be relined, the pipe winding apparatus having an annular cage through which the liquid flows;
   feeding the pipe winding apparatus an elongate plastic or plastic composite strip down into the pit, the strip having parallel spaced apart first and second edges;
   driving the strip downwards into the annular cage so as to present an incoming first edge to an adjacent second edge of a wound convolution of the strip;
   preventing liquid that has adhered to and ascended with the second edge from descending down towards the incoming first edge;
   applying a molten bead of plastic to at least one of the incoming first edge and the adjacent second edge of the newly wound pipe; and
   compressing the bead between the incoming first edge and the adjacent second edge,
   thereby forming an elongate continuously welded pipe in situ.

2. A method as claimed in claim 1 further comprising a step of:
   heating at least one of the incoming first edge and the adjacent second edge of the newly wound pipe,
   whereby the heating step improves adhesion of the bead to at least one of the incoming first and adjacent second edges.

3. A method as claimed in claim 2 wherein the heating step comprises:
   directing hot gas towards the incoming first edge, the gas heating the first edge; and
   directing hot gas towards the adjacent second edge, the gas heating the second edge.

4. A method as claimed in claim 1 wherein the preventing step comprises directing gas towards the second edge at a circumferential position on the second edge, the circumferential position being on an arc between the liquid being carried by the conduit and a point at or near the zenith of the second edge.

5. A method as claimed in claim 4 wherein the gas directed towards the second edge is directed in a direction substantially opposite of the direction of travel of the second edge.

6. A method as claimed in claim 1 wherein the preventing step comprises wiping the second edge at a circumferential position on the second edge, the circumferential position being on an arc between the liquid being carried by the conduit and a point at or near the zenith of the second edge.

7. A method as claimed in claim 6 wherein the wiping comprises brushing with a counter rotating brush.

8. A method as claimed in claim 1 wherein the preventing step comprises inducing a partial vacuum at a circumferential position on the second edge, the circumferential position being on an arc between the liquid being carried by the conduit and a point at or near the zenith of the second edge.

9. A method of lining an underground conduit while the conduit is in service carrying a liquid, the method comprising the steps of:
   positioning a pipe winding apparatus within an access pit adjoining the conduit to be relined, the pipe winding apparatus having an annular cage through which the liquid flows;
   feeding the pipe winding apparatus an elongate plastic or plastic composite strip down into the pit, the strip having parallel spaced apart first and second edges;
   winding the strip into the annular cage so as to form adjacent convolutions;
   directing a jet of hot gas towards an area spanning adjacent convolutions of the strip thereby creating a void within the liquid; and
   welding adjacent convolutions of the strip together within the gas void,
   thereby forming an elongate continuously welded pipe in situ, 10. An apparatus for lining an underground conduit, the apparatus comprising:
    an annular frame in use having a crown portion and a base portion;
    a strip guide disposed around and supported by the annular frame, the guide arranged to guide a strip around a helical path when the machine is in use, the path having a zenith;
    a drive assembly mounted to the frame for driving the strip downwards into the helical path in a winding direction so as to present an incoming first edge to an adjacent second edge of a wound convolution of the strip;
    a liquid remover mounted to the frame, the liquid remover arranged to prevent liquid that has adhered to and ascended with the second edge from descending down towards the incoming first edge; and
    an extruder mounted to the frame, the extruder having a nozzle in use extruding a molten bead of plastic onto the strip at a position just before said overlap.

11. An apparatus as claimed in claim 10 further comprising:
    a pair of strip pinch rollers mounted to the frame at a position circumferentially about halfway between the crown portion and the base portion, the pinch rollers driven by the drive assembly.

12. An apparatus as claimed in claim 10 further comprising:
    a heater mounted to the frame and positioned to heat at least one of the incoming first edge and the second edge.

13. An apparatus as claimed in claim 11 wherein the heater comprises:
    a first gas nozzle mounted to the frame, the first nozzle arranged to direct hot gas towards the incoming first edge; and
    a second gas nozzle mounted to the frame, the second nozzle arranged to direct hot gas towards the second edge.

14. An apparatus as claimed in claim 12 wherein the heater comprises:
    a first radiator mounted to the frame, the first radiator arranged to radiate heat towards the incoming first edge; and
    a second radiator mounted to the frame, the second radiator arranged to direct radiant heat towards the second edge.

15. An apparatus as claimed in claim 10 wherein the liquid remover comprises a third gas nozzle mounted to the frame, the third nozzle arranged to direct gas towards the second edge at a circumferential position on the second edge, the circumferential position being on an arc between the liquid being carried by the conduit and a point at or near the zenith of the second edge,
    wherein in use the third nozzle prevents liquid that has adhered to and ascended with the second edge from descending down towards the incoming first edge.

16. An apparatus as claimed in claim 10 wherein the liquid remover comprises a wiper mounted to the frame, the wiper engaging the second edge at a circumferential position on the second edge, the circumferential position being on an arc between the liquid being carried by the conduit and a point at or near the zenith of the second edge, wherein in use the wiper prevents liquid that has adhered to and ascended with the second edge from descending down towards the incoming first edge.

17. An apparatus as claimed in claim 16 wherein the wiper comprises a rotating brush.

18. An apparatus as claimed in claim 10 wherein the liquid remover comprises a partial vacuum inducing assembly mounted at a circumferential position on the second edge, the circumferential position being on an arc between the liquid being carried by the conduit and a point at or near the zenith of the second edge.

19. An apparatus as claimed in claim 10 wherein the annular cage is substantially cylindrical in shape.

20. An apparatus as claimed in claim 10 wherein the crown portion comprises a lifting member liftable by a crane.

21. An apparatus for lining an underground conduit while the conduit is in service carrying a liquid, the apparatus comprising:

a cylindrical frame in use having a crown portion and a base portion;

a plurality of substantially parallel spaced apart rollers disposed around and supported by the cylindrical frame, the rollers forming a guide to guide a strip around a helical path when the machine is in use, the path having a zenith;

a pair of strip pinch rollers mounted to the frame at a position circumferentially about halfway between the crown portion and the base portion;

a primary drive assembly mounted to the frame and operably connected to the pinch rollers for driving the strip downwards into the helical path in a winding direction so as to present an incoming first edge to an adjacent second edge of a wound convolution of the strip;

a liquid remover mounted to the frame, the liquid remover arranged to prevent liquid that has adhered to and ascended with the second edge from descending down towards the incoming first edge; and an extruder mounted to the frame, the extruder having a nozzle in use extruding a molten bead of plastic onto the strip at a position just before said overlap.

22. An apparatus as claimed in claim 21 further comprising a secondary drive assembly mounted to the frame, the secondary drive assembly providing additional driving torque to the primary drive assembly, wherein the additional driving torque allows the pipe to be produced in longer lengths in situ.

\* \* \* \* \*